(12) United States Patent
Choi

(10) Patent No.: US 6,292,138 B1
(45) Date of Patent: Sep. 18, 2001

(54) METHOD OF DETERMINING DISTANCE BETWEEN DIVERSITY ANTENNAS

(75) Inventor: Ho-Young Choi, Ansan (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/525,248

(22) Filed: Mar. 15, 2000

(30) Foreign Application Priority Data

Mar. 22, 1999 (KR) .................................................. 99-9590

(51) Int. Cl.[7] .......................................................... G01S 3/02
(52) U.S. Cl. ............................................. 342/458; 342/118
(58) Field of Search ................................. 342/118, 359, 342/458; 375/267, 347

(56) References Cited

U.S. PATENT DOCUMENTS 5,574,466 * 11/1996 Reed et al. ............................ 342/359
5,663,990 * 9/1997 Bolgiano et al. ..................... 375/347
6,104,768 * 8/2000 Speight ................................. 375/347

* cited by examiner

*Primary Examiner*—Dao Phan
(74) *Attorney, Agent, or Firm*—Steve Cha; Klauber & Jackson

(57) ABSTRACT

A diversity antenna distance determining method in radio telecommunications base station is provided. The method comprising the step of determining an allowable correlation coefficient of signals received through the first and the second antennas in a first frequency band which provides good diversity performance; determining a first distance $d_1$ between the antennas which satisfies the determined correlation coefficient in the first frequency band; and, determining a second distance $d_2$ between the two antennas based on $d_1$ in a second frequency band, which is different from the first frequency band. In the present invention, an optimal distance between antennas at one frequency is calculated using the data measured at another frequency to compensate the fading within a coverage area.

14 Claims, 3 Drawing Sheets

FIG. 1 [PRIOR ART]

METHOD OF DETERMINING DISTANCE BETWEEN DIVERSITY ANTENNAS

CLAIM OF PRIORITY

This application claims priority to an application entitled "Method of Determining Distance between Diversity Antennas" filed in the Korean Industrial Property Office on Mar. 22, 1999 and assigned Serial No. 99-9590.

BACKGROUND OF THE INVENTION

1. Field of the Invention

The present invention relates generally to diversity antenna placement, and in particular, to a method of determining an appropriate distance between two receiving antennas in a radio telecommunications base station (BS) to provide good diversity performance.

2. Description of the Related Art

A cellular radio telecommunications system divides the whole service area into a plurality of base stations cells, i.e., small service areas, and the base stations are centrally controlled through an exchange system. An antenna is implemented to transmit or receive radio signals throughout the service area in the radio telecommunications system. However, the radio frequency (RF) signal (voice or electrical wave) is susceptible to fading. Accordingly, the base stations employ more than one antenna to compensate for the fading over the communication channel via diversity. That is, the radio telecommunication system selects the optimal signal among the RF signals received through a plurality of receiving antennas in a complex propagation environment. Typically, a base station uses two receiving antennas spaced by a predetermined distance to achieve the space diversity. At least two antennas are separately placed at a prescribed distance to reduce the multipath fading of the received signals and to achieve a good space diversity performance.

FIG. 1 illustrates a schematic view of a conventional base station employing the diversity antennas. As shown in FIG. 1, the base station is comprised of a first antenna 110 for transmitting or receiving radio signals, a second antenna 120 exclusively used only for receiving the radio signals, and an indoor system 130 connecting the first antenna 110 to the second antenna 120. That is, the first antenna 110 serves the dual purpose of transmitting and receiving radio signals, and the second antenna 120 is exclusively used for the reception of radio signals. The distance between the receiving antennas is a very important factor in improving diversity performance in a radio telecommunications system. A diversity antenna placement method varies with the operation frequency band of the antenna, and the optimal antenna placement maximizes the diversity effect to overcome fading over the communication channel. In particular, the distance between the receiving antennas should be varied according to the operation frequency range of the antennas.

Most existing radio telecommunications systems use a frequency band of 900 MHz or 1.8 GHz. However, the antenna diversity technology of such system is not adaptable to a wireless local loop (WLL) system operating at 2.3 GHz band. As the RF signal experiences different phases of fading depending on the operation range of the frequency band, an optimal diversity antenna placement distance is necessary to bring good diversity performance at 900 MHz or 1.8 GHz band is not affective at 2.3 GHz band. Accordingly, the conventional diversity antenna placement method has its limitation in determining the optimum distance between the diversity antennas to achieve good diversity performance in a new radio environment that operates at a higher frequency band.

SUMMARY OF THE INVENTION

It is, therefore, an object of the present invention to provide a method for determining a diversity antenna placement in which a correlation coefficient is set at a prescribed level to compensate the intended degree of fading, wherein the antenna placement distance is calculated according to the correlation coefficient.

To achieve the above object, there is provided a diversity antenna-distance determining method. According to one aspect of the present invention, the ratio $\eta$ of an effective antenna height relative to the distance between two receiving antennas is selected with respect to one of the statistical correlation coefficients ($\rho$) of signals received through the antennas in a first frequency band. Then, a first distance $d_1$ between the two antennas is calculated in the first frequency band based on the calculated $\eta$, and a second distance $d_2$ between the two antennas is calculated in a second frequency band based on the calculated $d_1$.

According to another aspect of the present invention, an allowable or desirable correlation coefficient of the signals received through the first and the second antennas at a first frequency band is derived, a first distance $d_1$ between the antennas, which satisfies the requirement to operate within the determined correlation coefficient in the first frequency band, is calculated. A second distance $d_2$ between the two antennas is calculated using the calculated first distance ($d_1$) at a second frequency band, wherein the second frequency band differs from the first frequency band.

In the present invention, an optimal distance between antennas at a given frequency is calculated using the parameters measured from another frequency.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

In a radio telecommunications system according to the present invention having two receiving antennas spaced by a predetermined distance, the correlation coefficients of signals received through the antennas are obtained. In a statistical sense, the correlation coefficients represent the quantity used to rate the diversity effect that the antennas will be able to use at a relatively small separation distance. That is, the correlation coefficients represent the degree of mutual influences between the signals.

Therefore, an allowable correlation coefficient is derived to yield good diversity performance and the distance between the antennas is determined based on the derived correlation coefficient in the present invention.

Figure 1:
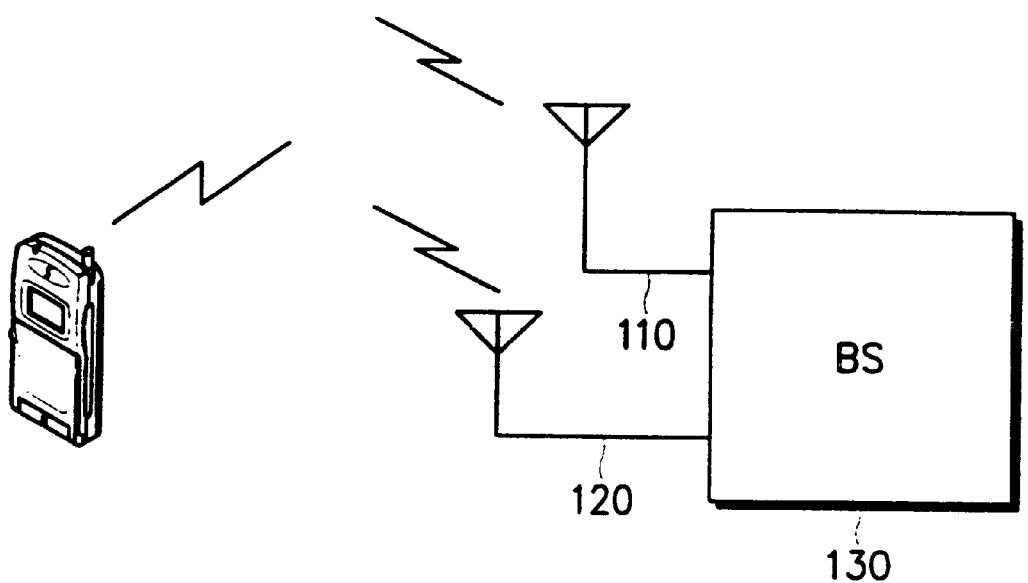
FIG. 1 is a schematic view of a conventional base station.
Figure 2:
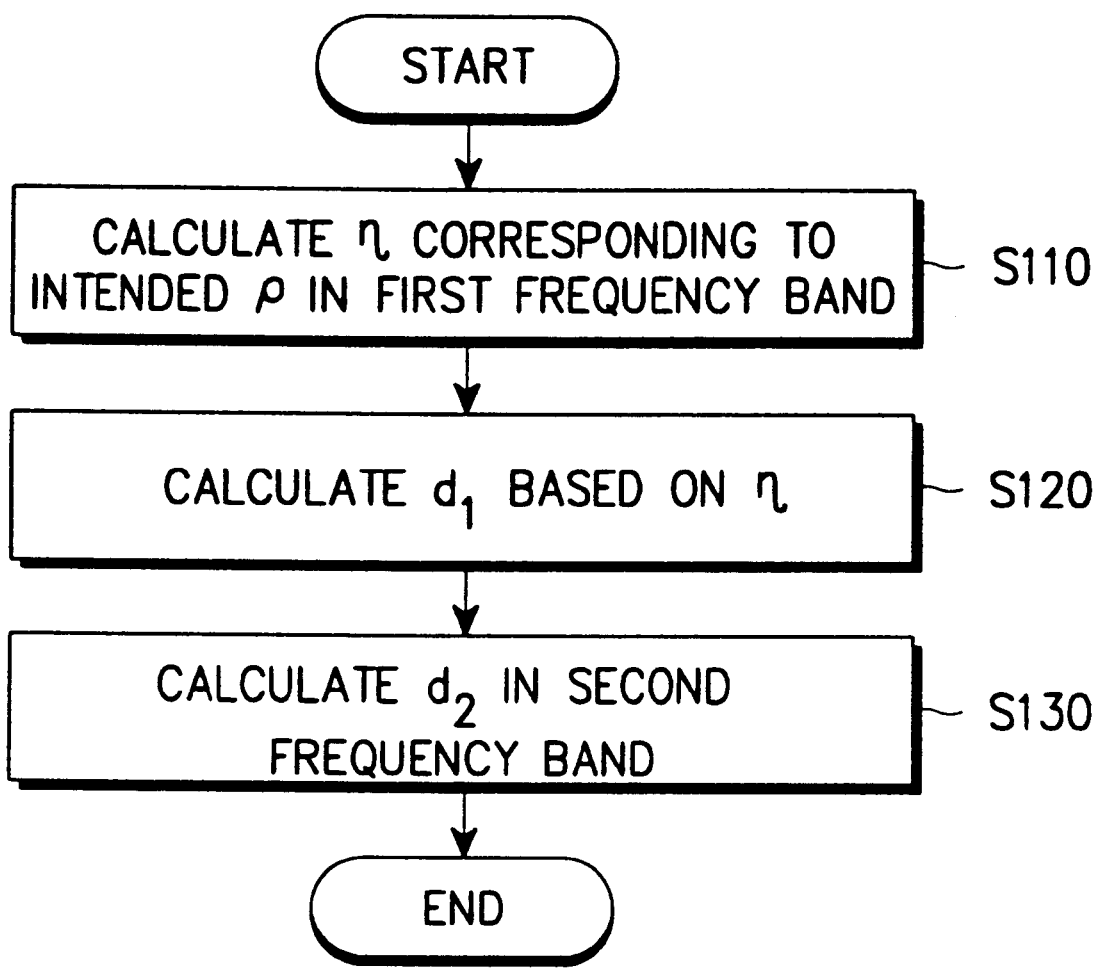
FIG. 2 is a flowchart illustrating an antenna distance determining method according to an embodiment of the present invention; and, FIG. 3 is an example of a graph showing the relation between a correlation coefficient $\rho$ and the ratio $\eta$ of an effective antenna height to an antenna distance in accordance with the present invention.

FIG. 2 is a flowchart illustrating an antenna-distance determining method according to an embodiment of the present invention. Referring to FIG. 2, a processor for determining an antenna distance according to the present invention calculates a ratio η, an effective antenna height to the distance between two receiving antennas, which satisfies an intended correlation coefficient among the statistical correlation coefficients (ρ) of the signals received through the antennas in a first frequency band to yield good diversity performance, in step s110. The processor determines a first distance $d_1$ between the two antennas in the first frequency band based on the calculated ratio η, in step s120, and thereafter a second distance $d_2$ between the two antennas in a second frequency band is calculated based on $d_1$, in step s130.

In accordance with the embodiment of the present invention, the processor determines the antenna distance in a target frequency band—the second frequency band, on the basis of the strengths of the received signals measured in the existing frequency band—the first frequency band.

Now, a detailed description of the preferred embodiment of the present invention is made herein.

In step s110, the processor of the present invention calculates the parameter η with respect to the specific correlation coefficient ρ using the strengths of a plurality of received signals measured in the first frequency band. The specific correlation coefficient is selected by the operator of the diversity antennas to yield good diversity performance. The η represents the ratio of an effective antenna height to the distance between two antennas. As the range of influence on the current flowing through a real antenna conductor is different from the actual height of the antenna, each antenna has a height indicating a vertical range of the current distribution influence which is different from the actual height of the antenna. The former is called the "effective antenna height."

As two receiving antennas for the receiving diversity have the same height and the same characteristics, their respective effective antenna heights are also the same. Setting the effective height of the two receiving antennas in the first frequency band as h and the distance between the antennas as d, then the ratio η is defined as $$\eta = \frac{h}{d}. \tag{1}$$

The two antennas are arranged to satisfy η in the above equation. If parts of the signal data received through the two antennas in the first frequency band are X and Y, respectively, the mean values and the standard deviation of a plurality of X and Y samples are computed. Then, the correlation coefficient ρ of the two fading signals are statistically obtained using the mean values E[X], E[Y], and E[XY], and the standard deviation ($\sigma_x$, $\sigma_y$) of X and Y as shown in Eq. 2:

$$\rho = \frac{E[XY] - E[X]E[Y]}{\sigma_x \sigma_y}. \tag{2}$$

Figure 3:
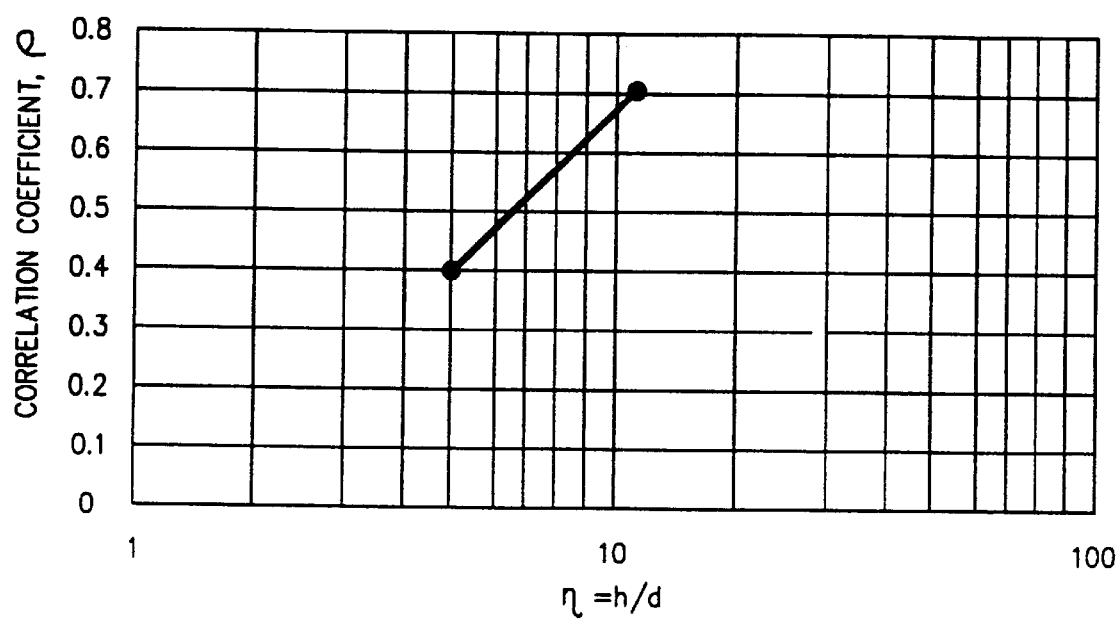

In the above procedure, the processor obtains a plurality of values for ρ corresponding to a plurality of values of η, then derives a graph illustrating the relationship between η and ρ. FIG. 3 illustrates an example of the relation graph which can be applied to the present invention.

From the graph as shown FIG. 3, a function of the parameter ρ can be derived as follows:

$$\rho = 0.9967 \log_\eta - 0.2967 \tag{3}.$$

If the two received signals are entirely independent, ρ is 0. However, as such scenario can not occur in a real propagation environment, the radio telecommunication system sets a specific correlation coefficient of the signals that provides the optimal receiving diversity effect.

Accordingly, the processor of the present invention sets the ρ to an acceptable value in the radio telecommunications system using the two receiving antennas, and calculates the specific value of η with respect to the ρ to achieve good diversity performance using Eq. 3.

After obtaining the specific value η in step s120, the processor calculates the first distance $d_1$ between the two antennas using a specific effective antenna height h, as shown in Eq. 1.

Then, as the distance between two diversity antennas is closely related with their operation frequency, the processor calculates the second distance $d_2$ in an intended frequency band, the second frequency band F2, based on the first frequency band F1 and the first distance $d_1$ in step s130, as illustrated in the following Eq. 4:

$$d_2 = d_1 \left( \frac{F1}{F2} \right). \tag{4}$$

For example, in order to obtain the distance between antennas at 2.3 GHz using the measured data X and Y at 850 MHz, $d_2$ is computed by replacing F1 with 850 and F2 with 2300 in Eq. 4.

In the following table 1, using the measured parameter data at 850 MHZ which includes ρ, η, $d_1$ at 850 MHz, the target distance $d_2$ according to the present invention at 2.3 GHz is calculated.

TABLE 1

| ρ | η | $d_1$ (850MHz) | $d_2$ (2.3GHz) |
|---|---|---|---|
| 0.3 | 3.97 | 5.039116118 | 1.862282044 |
| 0.35 | 4.45 | 4.48940535 | 1.659128064 |
| 0.4 | 5 | 3.99966183 | 1.478135894 |
| 0.45 | 5.61 | 3.563343808 | 1.316887929 |
| 0.5 | 6.3 | 3.174623165 | 1.1732303 |
| 0.55 | 7.07 | 2.828307561 | 1.045244099 |
| 0.6 | 7.94 | 2.519771087 | 0.931219749 |
| 0.65 | 8.91 | 2.244892464 | 0.829634171 |
| 0.7 | 10 | 2 | 0.739130435 |
| 0.75 | 11.2 | 1.781822544 | 0.658499636 |
| 0.8 | 12.6 | 1.587445789 | 0.586664748 |
| 0.85 | 14.1 | 1.414273347 | 0.522666237 |
| 0.9 | 15.9 | 1.259992066 | 0.465649242 |

For ρ=0.5, the processor of the present invention determines $d_2$=1.1732303 at 2.3 GHz referring to (table 1). Then, the system operator arranges two antennas operated at 2.3 GHz to be spaced apart by 1.1732303 m, to achieve the optimal diversity effect through the diversity antennas.

As described above, the present invention determines an optimal distance between diversity antennas at 2.3 GHz in an WLL base station to achieve good diversity performance. That is, the optimal distance between the antennas at a given frequency band is calculated using the parameter data measured at another frequency band. As a result, an optimal distance is obtained to better compensate the fading.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for determining a placement of diversity antennas using a processor, comprising the steps of:
    (a) determining a ratio ($\eta$) representing an effective antenna height of the diversity antennas divided by a distance between the diversity antennas, wherein the ratio ($\eta$) is determined based on one of predetermined correlation coefficients ($\rho$) of receive signals through the diversity antennas in a first frequency band;
    (b) calculating a first distance $d_1$ between the diversity antennas in the first frequency band based on the determined ratio ($\eta$); and,
    (c) calculating a second distance $d_2$ between the diversity antennas in a second frequency band based on the calculated first distance ($d_1$).

2. The method of claim 1, wherein the determining the ratio ($\eta$) comprises the steps of:
    determining a set of statistical correlation coefficients ($\rho$) of the receive signals based on the strength of the receive signals in the first frequency band and determining a set of the ratio ($\eta$) by dividing the effective height of the diversity antennas by the distance between a set of the diversity antenna locations within a coverage area;
    determining a graphical relationship between the determined the statistical correlation coefficients ($\rho$) and the set of the ratio ($\eta$) based on the strength of receive signals through the diversity antennas in the first frequency band;
    deriving a $\rho$-$\eta$ relation formula from the determined graphical relationship; and,
    selecting the ratio ($\eta$) corresponding to the one of the statistical correlation coefficients ($\rho$) based on the $\rho$-$\eta$ relation formula.

3. The method of claim 2, wherein the selected correlation coefficient ($\rho$) is selected to provide good diversity performance.

4. The method of claim 1, wherein the first distance ($d_1$) is calculated according to the following equation:

$$d_1 = h/\eta,$$

wherein h represents the effective antenna height and $\eta$ represents the determined ratio ($\eta$).

5. The method of claim 3, wherein the first distance ($d_1$) is calculated according to the following equation:

$$d_1 = h/\eta,$$

wherein h represents the effective antenna height and $\eta$ represents the determined ratio ($\eta$).

6. The method of claim 1, wherein the second distance ($d_2$) is calculated by the following equation:

$$d_2 = d_1 \left( \frac{F1}{F2} \right)$$

wherein F1 represents the first frequency band, F2 represents the second frequency band, and $d_1$ represents the first distance.

7. The method of claim 6, wherein the predetermined correlation coefficient $\rho$ is determined by a diversity antenna operator.

8. The method of claim 7, wherein the first distance ($d_1$) is calculated by the following equation:

$$d_1 = h/\eta,$$

wherein h represents the effective antenna height and $\eta$ represents the determined ratio ($\eta$).

9. A method for determining a placement of diversity antennas using a processor, comprising the steps of:
    (a) determining a set of correlation coefficients based on receive signals through a first antenna and a second antenna in a first frequency band;
    (b) calculating a first distance ($d_1$) between the diversity antennas which satisfies a predetermined correlation coefficient among the set of the determined correlation coefficients in the first frequency; and,
    (c) calculating a second distance ($d_2$) between the diversity antennas in a second frequency band based on the calculated first distance ($d_1$).

10. The method of claim 9, wherein the correlation coefficients are statistically determined based on the strength of the receive signals through the diversity antennas in the first frequency band.

11. The method of claim 10, wherein calculating the first distance ($d_1$) comprises the steps of:
    determining a graphical relationship between the correlation coefficients ($\rho$) and a set of the ratio ($\eta$) based on the strength of the receive signals through the diversity antennas in the first frequency band, wherein the ratio is determined by an effective height of the diversity antennas by the distance between a set of the diversity antenna locations within a coverage area;
    deriving a $\rho$-$\eta$ relation formula from the determined graphical relationship; and,
    determining the ratio ($\eta$) corresponding to an intended correlation coefficient ($\rho$) based on the $\rho$-$\eta$ relation formula; and,
    determining the first distance by diving the effective height by the determined ratio ($\eta$).

12. The method of claim 11, wherein the second distance ($d_2$) is calculated by the following equation:

$$d_2 = d_1 \left( \frac{F1}{F2} \right)$$

wherein F1 represents the first frequency band, F2 represents the second frequency band, and $d_1$ represents the first distance.

13. The method of claim 12, wherein the predetermined correlation coefficient $\rho$ is determined by a diversity antenna operator.

14. The method of claim 13, wherein predetermined correlation coefficient ($\rho$) is selected to provide good diversity performance.

* * * * *